United States Patent [19]
Snail et al.

[11] Patent Number: 5,745,234
[45] Date of Patent: Apr. 28, 1998

[54] VARIABLE ANGLE REFLECTOMETER EMPLOYING AN INTEGRATING SPHERE AND A LIGHT CONCENTRATOR

[75] Inventors: Keith A. Snail, Silver Spring; Leonard Hanssen, Gaithersburg, both of Md.; David Chenault, Mary Esther, Fla.

[73] Assignee: The United States of America as represented by the Secretary of the Navy, Washington, D.C.

[21] Appl. No.: 509,480

[22] Filed: Jul. 31, 1995

[51] Int. Cl.⁶ ..................................... G01J 1/04
[52] U.S. Cl. ............................................... 356/236
[58] Field of Search ..................... 356/445–446, 356/236

[56] References Cited

U.S. PATENT DOCUMENTS

| | | | |
|---|---|---|---|
| 2,992,588 | 7/1961 | Henderson | 88/14 |
| 4,114,592 | 9/1978 | Winston | 126/270 |
| 4,575,252 | 3/1986 | Akiyama et al. | 356/446 |
| 4,640,617 | 2/1987 | Hughes et al. | 356/326 |
| 4,810,872 | 3/1989 | Murakoshi et al. | 250/225 |
| 5,384,641 | 1/1995 | Imura et al. | 356/446 |

OTHER PUBLICATIONS

R.A. Shepherd, Absolute Measurement of Diffuse and Specular Reflectance Using an FTIR Spectrometer With an Integrating Sphere, Proc. of SPIE, vol. 1311, 55–69 (1990), no month available.

K. Snail et al., Integrating Sphere Designs With Isotropic Throughput, Applied Optics, vol. 28, No. 10, 1793–1799, May 15, 1989.

W. Richter et al., Accurate Diffuse Reflection Measurements in the Infrared Spectral Range, Applied Optics, Vo.. 26, No. 21, 4620–4624, Nov. 1, 1987.

X. Ning et al., Dielectric Totally Internally Reflecting Concentrators, Applied Optics, vol. 26, No. 2, 300–305, Jan. 15, 1987.

K. Gindele et al., Spectral Reflectance Measurements Using an Integrating Sphere in the Infrared, Applied Optics, vol. 24, No. 12, 1757–1760, Jun. 15, 1985.

*Primary Examiner*—Frank G. Font
*Assistant Examiner*—Amanda Merlina
*Attorney, Agent, or Firm*—Thomas E. McDonnell; Ralph T. Webb

[57] ABSTRACT

A reflectometer and a method for measuring the reflectance and transmittance of material using an integrating sphere and a light concentrator. The reflectance and transmittance measurements are performed as a function of the angle of incidence of a beam of light onto a sample and reference material. In a preferred embodiment, a CHC-lens concentrator having a high f/# and a low index of refraction is used.

8 Claims, 4 Drawing Sheets

VARIABLE ANGLE REFLECTOMETER EMPLOYING AN INTEGRATING SPHERE AND A LIGHT CONCENTRATOR

BACKGROUND OF THE INVENTION

1. Field of the Invention

The present invention relates generally to a reflectometer for measuring the directional hemispherical reflectance and transmittance of materials. More particularly, the present invention relates to measuring the reflectance and transmittance of materials as a function of the angle of incidence of a beam of light.

2. Description of the Related Arts

The spectral reflectance and transmittance of materials are often needed physical properties of surfaces. In the past, there were several attempts to measure the reflectance and transmittance of materials with varying results. More particularly, integrating spheres have been used for measuring the optical properties of materials. In obtaining these measurements, various types of optical devices were used with integrating spheres for collecting light. These optical devices include collimators, and various refractive or reflective surfaces (see U.S. Pat. Nos. 5,384,641; 4,810,872; 4,575,252; 4,114,592; 2,992,588; R. Shepherd, Absolute Measurement of Diffuse and Specular Reflectance Using an FTIR Spectrometer with an Integrating Sphere, Proc. of SPIE, Vol. 1311, 55–69 (1990); X. Ning et al., Dielectric Totally Internally Reflecting Concentrators, Applied Optics, Vol. 26, No. 2, 300–305 (1987); W. Richter et al., Accurate Diffuse Reflection Measurements in the Infrared Spectral Range, Applied Optics, Vol. 26, No. 21, 4620–4624 (1987); and K. Gindele et al., Spectral Reflectance Measurements Using an Integrating Sphere in the Infrared, Applied Optics, Vol. 24, No. 12, 1757–1760 (1985) incorporated respectively herein by reference in their entirety and for all purposes). When using these optical devices, certain distortions occur in the measurement of the power of light collected from a predetermined field of view (FOV). These distortions have produced significant systematic errors in the calculation of the reflectance and transmittance of materials (see O. H. Olson et al., Asymmetry of an Integrating Sphere, Applied Optics Vol. 2, No. 6, 631 (1963); K. A. Snail et al., Integrating Sphere Designs with Isotropic Throughput, Applied Optics Vol. 28, No. 10, 1793–1799 (1989) incorporated respectively herein by reference in their entirety and for all purposes).

Generally, two main sources have been identified as causing these systematic errors. The first source of error is due to the direct scattering of light reflected by the surface of a sample material to a field of view (FOV) projection area on the inner surface of the integrating sphere. This source of error was circumvented by using specially situated baffle(s) to prevent the direct scattering of light between the sample material and the FOV. The second source of error has been traced to the undesired penetration, or leakage, of light rays from outside the FOV projection area into the optical/ detection device. The present invention provides a new design to minimize the effect of the second source distortion.

Furthermore, previous variable angle reflectometer measuring systems have exhibited low signal throughput and signal-to-noise (SNR) ratios. This deterioration in signal level occurs especially at large angles of incidence where the beam of light must be apertured down to prevent overfilling of the sample material. To improve the signal throughput and the SNR, compound elliptical concentrators (CEC) were used in the past. However, when controlling the size of the FOV, the CEC concentrator's physical dimension could become considerably large. Accordingly, the utility of a CEC concentrator in these designs became very limited.

SUMMARY OF THE INVENTION

The object of the present invention is to provide an apparatus and a method for measuring the reflectance and transmittance of a material using an integrating sphere.

A further object of the present invention is to use the apparatus and method with a sample material in a center-mounted configuration to achieve an improved throughput and signal-to-noise ratio (SNR) for reflectance measurement.

A further object of the present invention is to improve the measurement accuracy of the reflectance of a sample material.

A further object of the present invention is to provide a low index-high f/# lens-concentrator (LIMC).

A final object of the present invention is to provide for operation of the integrating sphere in an absolute mode without the use of a reference material.

According to the present invention, the foregoing and other objects are attained by projecting a beam of light onto a surface of a sample material for measuring its reflectance and transmittance. The sample material is mounted in the center of an integrating sphere. The projected beam of light is reflected by the surface of the sample material in at least one direction onto the inner surface of the integrating sphere. The surface of the sample material, whose reflectance is being measured, is capable of tilting between near normal and about 80 degrees from normal. This tilting mechanism allows reflectance measurements as a function of the angle of incidence of the beam of light onto the surface of the sample. A light concentrator is used to collect rays of light from a field of view (FOV) projected on the inner surface of the integrating sphere. A baffle is used to prevent the direct scattering of light between the surface of the sample, or reference, material and the FOV projection area. The light concentrator amplifies and guides the collected rays of light to a detecting surface. A detector measures the power of the collected light to determine the reflectance, or reflectance and transmittance, of the sample material.

The present invention provides a significant improvement in the signal throughput and SNR by using a compound hyperbolic concentrator (CHC)-lens or a dielectric totally internally reflecting concentrator (DTIRC) with the integrating sphere. Moreover, the systematic errors are minimized by using a specially designed concentrator with a low-index high f/# lens-mirror concentrator (LIMC). These and other improvements will become more apparent from the following sections.

BRIEF DESCRIPTION OF THE DRAWINGS

The present invention will now be described with reference to the drawings wherein.

DETAILED DESCRIPTION OF THE INVENTION

Figure 1:
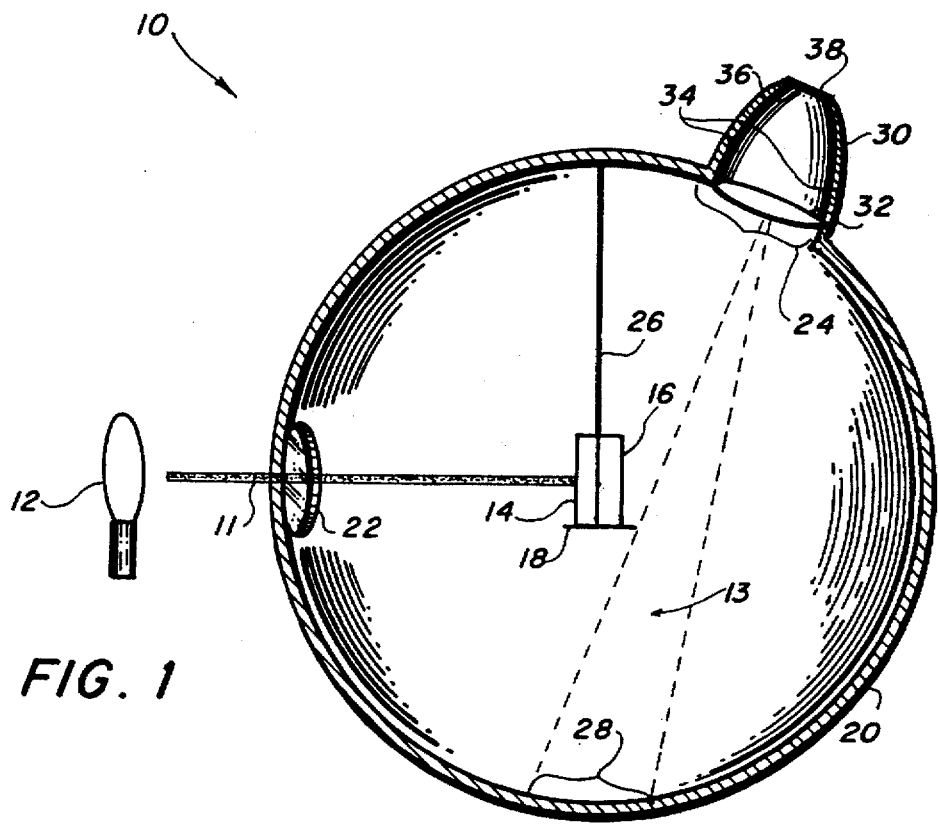
FIG. 1 shows a configuration of the center-mount integrating sphere with a CHC-lens, or a LIMC, concentrator.

As shown in FIG. 1, a reflectometer measuring system 10 may be configured using a light source 12, an integrating sphere 20 with a center-mounted sample material 14 and reference material 16, and a light concentrator 30. These and related elements, and variations thereof, are described in detail below. Note that similar objects use the same reference numbers in all figures presented in this section.

The light source 12 used in the present invention is capable of emitting a beam of light 11 having a single or a plurality of wavelengths. As an alternative, a light source capable of generating a plurality of wavelengths may be used with a light filtering device in the present invention, such as a grading, an interferometer, or a circularly variable filter. Typically, the wavelength(s) used for this application range(s) from ultraviolet (e.g. 300 nanometer) to far infrared (e.g. 100,000 nanometers) light. Depending on the application, wavelength(s) between 2,000–20,000 nanometers are frequently used. Certain applications, however, may require wavelength(s) ranging between 300–2,500 nanometers. Such light sources are widely available, and can be easily obtained commercially.

The integrating sphere 20 is used to measure diffuse reflectance and diffuse transmittance—also known as directional hemispherical reflectance/transmittance. Typically, the integrating sphere 20 may have a diameter between about 1–15 inches. In the present invention, for measurements using ultra violet, visible light, or near infrared (wavelengths less than 2,500 nanometers), the inner surface of the integrating sphere is coated with a diffusing coating layer, known as Lambertian coating, consisting of a white diffuser such as MgO, $BaSO_4$, Polytetrafluoroethylene (PTFE), or other similar coating material with high reflective characteristics (e.g. coating material with a reflectance of at least 90% may be used). For measurements using infrared (IR) light (wavelengths greater than 2,500 nanometers), roughened metal surface (e.g. alloy, Al, Ni, or diffuse gold surface) can be used as a coating layer. The roughened metal surface is frequently produced by sandblasting or plasma-spraying, followed with plating with Au or other high reflective metal (e.g. brass, Cu, Pt, or Ag). Typically, such coating material exhibit a reflectance of at least 90%. Such coating material is layered uniformly on the inner surface of the integrating sphere 20.

An entry port 22 on the integrating sphere 20 is used to permit the beam of light 11 to enter into the sphere along a sphere radius. Another port 24 on the integrating sphere 20 is used to allow the light concentrator 30 to collect rays of light from the inner surface of the integrating sphere 20. Typically, the total area of the ports may not exceed 5% of the total area of the surface of the integrating sphere 20. Ports tend to introduce nonuniformities into an integrating sphere's throughput which can lead to systematic errors in diffuse reflectance measurements. If different fractions of the radiation reflected from the sample and reference exit the entry port 22 before striking the sphere wall, the measured reflectance will be incorrect. The size of this systematic error can be compensated for by using a simple mathematical model in the calculation of the reflectance of a material. The sample material 14 is mounted on an attachment 26 with its front surface in the geometric center of the integrating sphere 20. Rotation of the sample about an axis lying in its front surface and passing through its center varies the incident angle of the beam of light 11. Upon projecting the beam of light 11 on the surface of the sample 14, the primary reflected beam of light 11 strikes different parts of the integrating sphere's 20 wall. Small changes in the sample's 14 reflectance with rotation are expected due to changes in the average number of reflections on the sample 14 and the average incidence angle. The sample 14 is capable of tilting between near normal and about 80 degrees from normal. This tilting mechanism allows reflectance measurements as a function of the angle of incidence of the beam of light 11 onto the surface of the sample 14.

In the present invention, it is required that light scattered from the surface of the sample not directly impinge upon the detector's field of view (FOV) projection area 28, as projected on the inner surface of the integrating sphere 20. The FOV projection area 28 is defined by the light concentrator 30 which will be further discussed below. A baffle(s) 18 is situated so as to prevent the sample and reference from interchanging (e.g. scattering) radiation directly with the FOV projection area 28 or with the light concentrator 30. In a preferable embodiment, the baffle 18 is designed from a thin plate with specular high reflectance surfaces. This design has the advantage of not disturbing the symmetry of the integrating sphere's 20 light field.

Nonimaging light concentrators have been applied to many light collection problems in the art. The application of nonimaging concentrators to instruments used to measure optical properties is relatively new. In the present invention, a compound hyperbolic (or near hyperbolic) concentrator (CHC) 30 with a lens 32 may be used to collect and concentrate light from a FOV projection area 28 on the inner surface of the integrating sphere 20. The light concentrator comprises a mirror shape boundary 34 which can be a concave hyperbolic arc or, as an alternate, a convex hyperbolic arc. The mirror shape boundary 34 is required to direct light from the edge of the FOV projection area 28 on the inner surface of the integrating sphere 20 to the edge of a detector 38 at the detection surface 36. For a real lens, the mirror shape may deviate from a hyperbola in order to correct for lens aberrations. For rays in a meridional plane, a concave hyperbolic concentrator 30 redirects the light originating in the FOV area to the detection surface 36 with at most one reflection. A meridional plane is defined as the plane that contains the optic or symmetry axis of a conical concentrator. Alternatively, in a second embodiment, a convex hyperbolic concentrator 30 is used to permit multiple reflections of the beam of light impinging on the hyperbolic mirror (also known as an ideal non-imaging concentrator).

Figure 2:
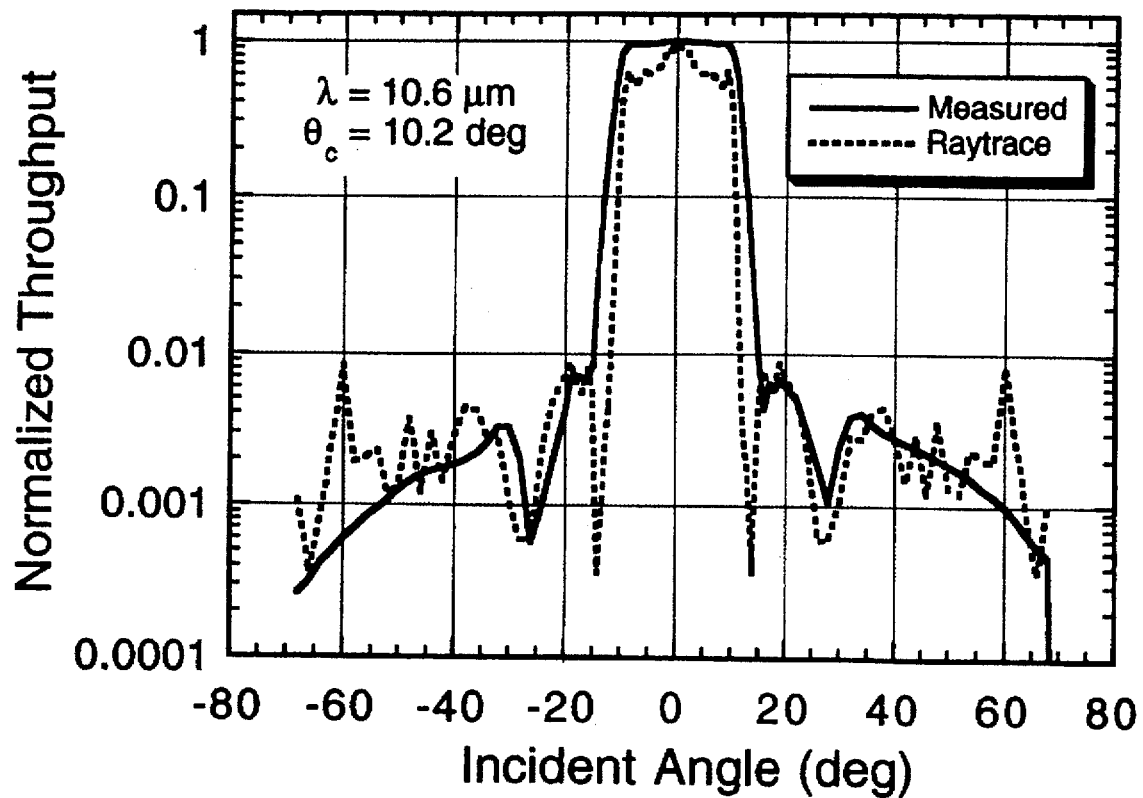
FIG. 2 is a diagram showing the variations in throughput as a function of the angle of incidence of the light on the refractive surface of a CHC-lens concentrator with a FOV half-angle of 10.2 degrees and an f/1.5 KCl lens.
Figure 3:
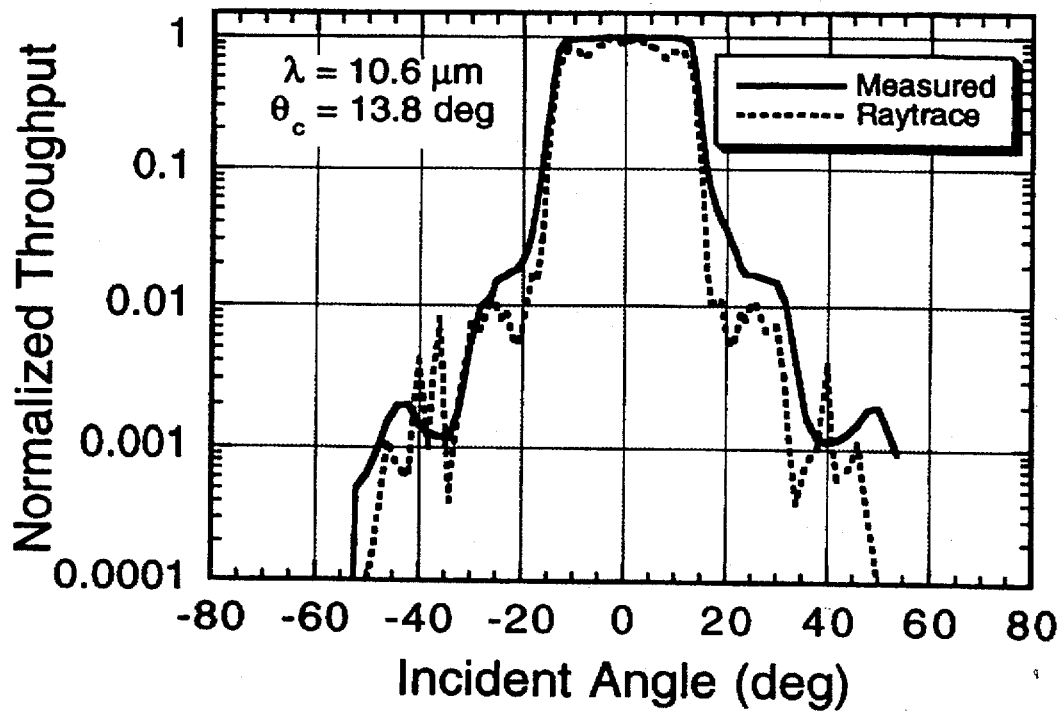
FIG. 3 shows the variations in throughput as a function of the angle of incidence of the light on the refractive surface of a CHC-lens concentrator with a FOV half-angle of 13.8 degrees and an f/3 KCl lens.

In another embodiment, a low index-high f/# lens-mirror concentrator (LIMC) 30 is used with the integrating sphere. The purpose of using a LIMC concentrator is to minimize the effect of the distortion caused by the light penetrating into the light concentrator 30 from outside the FOV projection area. FIG. 2 shows the variations in throughput as a function of the angle of incidence of the light on the refractive surface 32 of a concentrator having a FOV half-angle of 10.2 degrees and f/1.5 KCl lens (n=1.46) 32. Earlier raytracing studies with a ZnSe lens (n=2.42) showed a 1% throughput at an angle of incidence of 45 degrees. This level of throughput produces large variations in the integrating sphere's throughput for light passing directly from the sample to the light concentrator. This phenomenon has been traced to the multiple reflection effects within the lens 32. FIG. 3 shows the variations in throughput as a function of the angle of incidence for a light concentrator having a FOV half-angle of 13.8 degrees and a f/3 KCl lens. Comparing FIG. 2 with FIG. 3, FIG. 3 shows a significant reduction in the throughput of the light outside the FOV projection area is observed. Thus, it is recommended that a lens having an f/# of at least f/3, and an index of refraction below 2, be used in this embodiment. It is preferable, however, that the index of refraction be selected even below 1.5.

Figure 4:
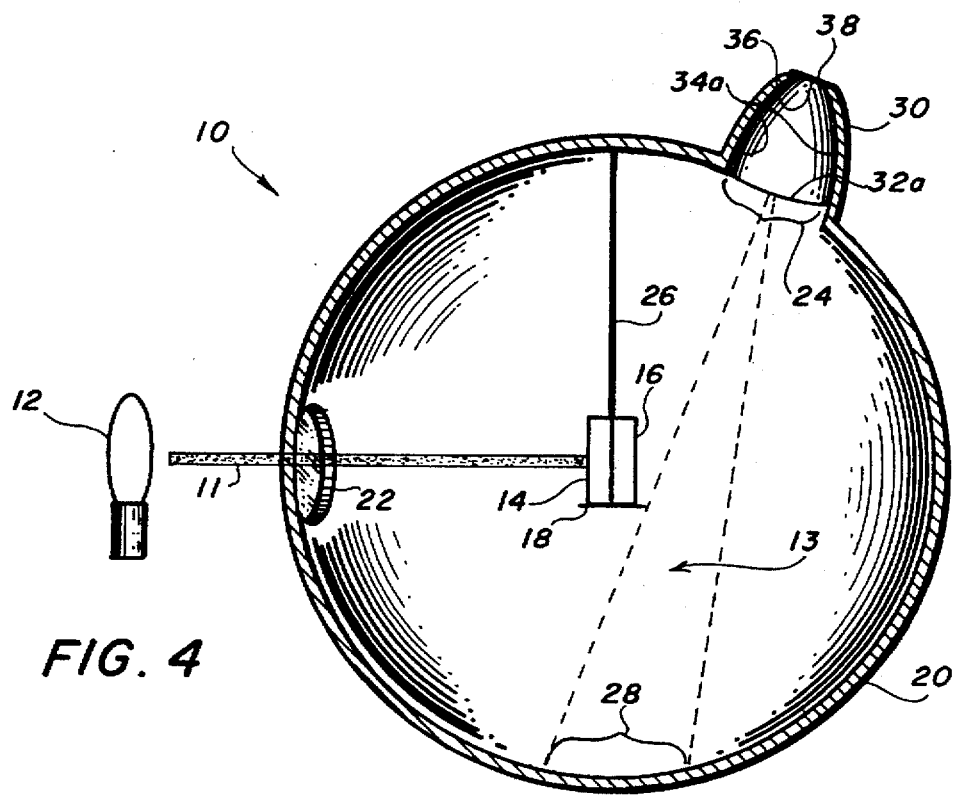
FIG. 4 shows a configuration of the center-mount integrating sphere with a DTIRC concentrator.

As shown in FIG. 4, in another embodiment, a dielectric totally internally reflecting concentrator (DTIRC) 30 may be used to collect and concentrate the light reflected by the FOV projection area 28. The DTIRC 30 is a nonimaging concentrator which is made entirely from a dielectric material. In practice, dielectric material may absorb the light being collected. Thus, in the present invention, it is recommended that the DTIRC material be selected such that its light absorption rate is no more than 25% of the power of the collected light. The DTIRC material's index of refraction (n) should be selected to be close to the index of refraction of the detector material. The collecting aperture 32a of the DTIRC is curved to simulate the characteristics of a lens. The side walls 34a of the DTIRC may also be curved to ensure total internal reflection at the side walls 34a for all the rays of light entering into the DTIRC concentrator 30 from within the FOV projection area 28. As the beam of light 11 is reflected by the FOV projection area 28 to the DTIRC 30, it is refracted at the collecting aperture 32a of the DTIRC, and is reflected internally by the side walls 34a. In order to ensure total internal reflection, the side walls are designed so that the refracted light strikes the DTIRC side walls 34a at greater than the critical angle. The critical angle is defined by:

$$\theta_c = \sin^{-1}(1/n)$$

where n is the index of refraction of the dielectric material. Under these conditions, light striking the side walls 34a at greater than the critical angle will be reflected at 100%. If the index of refraction (n) of the DTIRC is equal to the index of refraction of the detection material, then the concentration (see infra) of the DTIRC will exceed that of the lens-mirror concentrator (e.g. CHC) by a factor of $n^2$ (less any increase in front surface reflection losses, which can be minimized with an anti-reflection coating). The concentration is defined as the ratio of the collecting aperture area 32a to the detection aperture 36 area. For materials with an index of refraction near 4 (e.g. Germanium in the IR), this represents a factor of 16 increase in the area of the collecting aperture for the same size detector. The throughput and the SNR of the integrating sphere 20 are directly proportional to the size of the collecting aperture area 32a. Thus, the use of a DTIRC 30 can potentially provide a significant improvement in the SNR of the collected light over a conventional lens-mirror concentrator.

In the above-described embodiments, the light concentrator 30 is mounted so that light reflected by the sample 14 or the reference 16 material does not pass directly to the FOV projection area 28 or the light concentrator 30. As shown in FIG. 1, a beam of light 11 is projected onto the surface of a sample material 14 for measuring its reflectance and transmittance. The sample material 14 is mounted in the center of an integrating sphere 20 with its front surface facing the path of the projected beam of light 11, and positioned between near normal and 80 degrees from normal. The projected beam of light 11 is reflected by the surface of the sample 14 material in at least one direction throughout the inner surface of the integrating sphere 20. One of the above-described light concentrators is used to collect rays of light from the field of view (FOV) projected 28 on the inner surface of the integrating sphere 20. The light concentrator 30 collects rays of light within the FOV projected area 28 and, then, measures the power of the concentrated light. The same procedure is repeated for the reference material 16 with its surface receiving the projected beam of light 11. Similarly, the light concentrator 30 measures the power of the concentrated light. The two measured powers are compared, and the reflectance and transmittance of the sample 14 material are calculated accordingly.

The present invention is further capable of performing measurements of the reflectance and transmittance of a material without the use of a reference material. This measuring technique is known as absolute measurement. In this embodiment, similar to previous configurations, the power of light reflected from the sample 14 material is first measured using a light concentrator 30. Then, the beam of light 11 is directed to an area on the inner surface of the integrating sphere 20. The power of light reflected from the area is collected and measured using a light concentrator 30. The measured powers of the light are compared and the reflectance and transmittance of the sample material are calculated accordingly.

Figure 5:
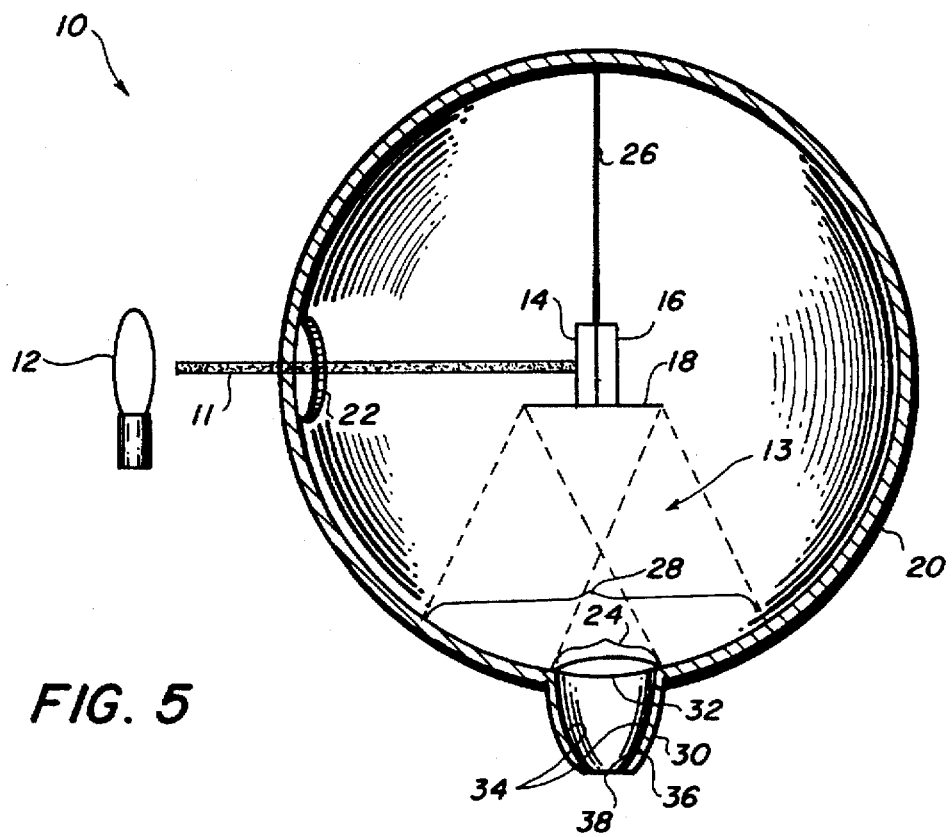
FIG. 5 shows another configuration of the center-mount integrating sphere with a CHC-lens concentrator, wherein an exemplary specular baffle is used to view the sphere wall directly below the sample.

In FIG. 5, another configuration of the center-mount integrating sphere with a light concentrator is shown. A specular baffle 18 is used to view the sphere wall directly below the sample. The size of the baffle 18 may be varied to control the size of the FOV projection area 28 on the inner surface of the integrating sphere 20. Any of the above-described light concentrators may be used in this embodiment. The method of measuring the power of light collected by the light concentrator 30 is similar to that described for FIG. 1 above. The reflectance and transmittance of the sample material are calculated accordingly.

Figure 6:
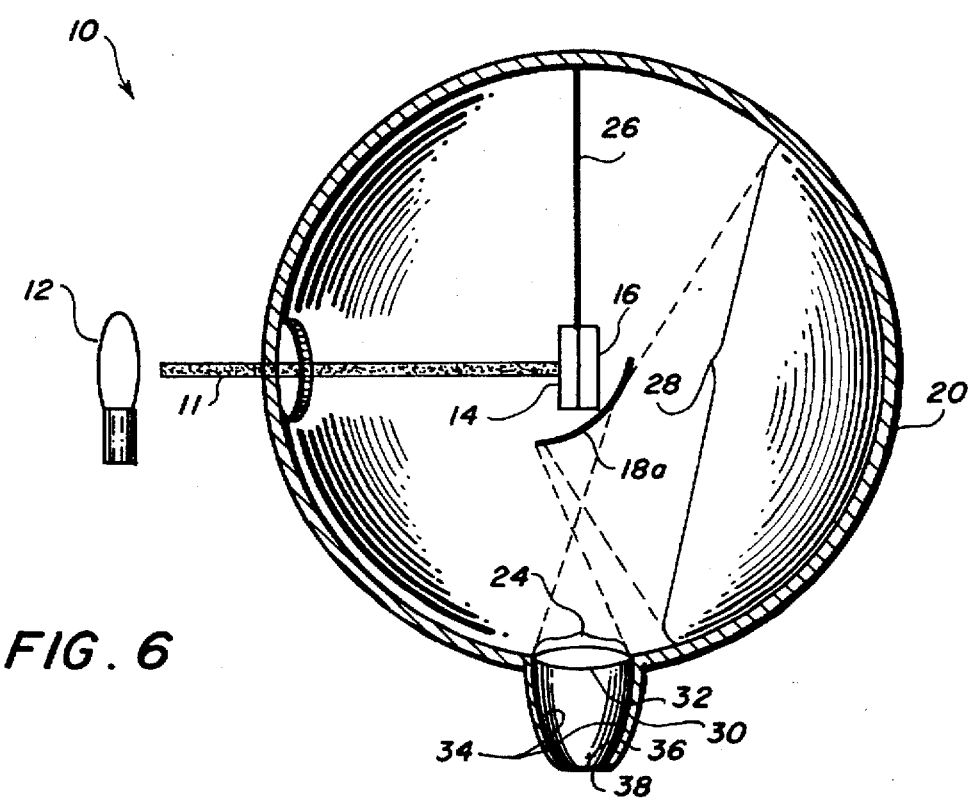
FIG. 6 shows another configuration of the center-mount integrating sphere with a CHC-lens concentrator, wherein a convex mirror is used so that the detector FOV is projected onto the sphere wall behind the sample.

In FIG. 6, another configuration of the center-mount integrating sphere with a light concentrator is shown. A convex mirror 18a is used so that the FOV projection area 28 is located onto the sphere wall behind the sample 14. The size or convexity of the mirror 18a may be varied to control the size of the FOV projection area 28 on the inner surface of the integrating sphere 20. A greater FOV projection area 28 is achieved using this configuration thereby reducing shadowing errors due to the attachment 26, the sample 14, and the reference 16. Any of the above-described light concentrators may be used in this embodiment. The method of measuring the power of light collected by the light concentrator 30 is similar to that described for FIG. 1 above. The reflectance and transmittance of the sample material are calculated accordingly.

Figure 7:
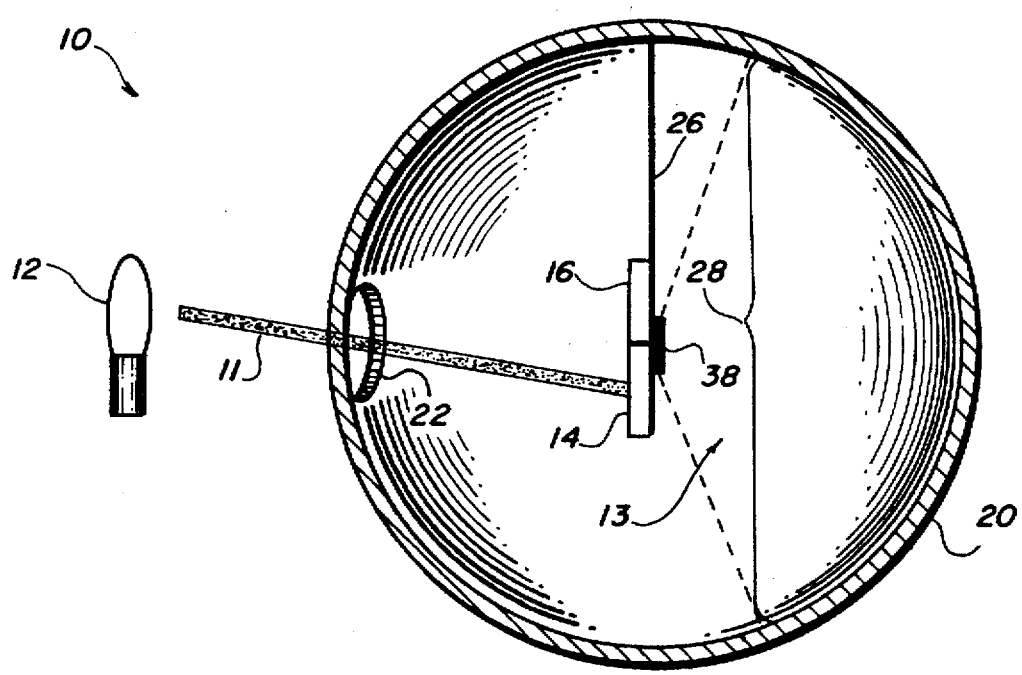
FIG. 7 shows another configuration of the center-mount integrating sphere without a concentrator, wherein a detector is mounted on the back of the sample and a reference so that the detector views the hemisphere behind the sample.

In FIG. 7, another configuration of the center-mount integrating sphere with a light concentrator is shown. A detector 38 is mounted on the back of the sample 14 and the reference 16 so that the detector 38 views the hemisphere behind the sample. The sample 14 and the reference 16 material are mounted side-to-side. No baffle is used in this configuration. The method of measuring the power of light collected by the light concentrator 30 is similar to that described for FIG. 1 above. The reflectance of the sample material is calculated accordingly.

A gold-coated wedged sample material, whose reflectance does not vary significantly as the sample rotates about the direction of the incident beam of light, may be used to test the uniformity of an integrating sphere's throughput. For integrating spheres using a CHC-lens, a DTIRC, or a LIMC concentrator, and having uniform Lambertian coating on its inner surface as disclosed in the present invention, the variation in the apparent reflectance of the wedged sample is estimated to be less than 1–2%. Earlier sphere designs can exhibit variations of greater than 20–25% in the apparent reflectance of the material.

EXAMPLE 1

The following is a prophetic example.

Use an integrating sphere having a 7-inch diameter coated with a diffuse gold (Au) coating, e.g. infragold LF (Labsphere). The integrating sphere should have three (3) circular ports. The centers of these three ports are located on the same great circle. The first port is a beam port having a 1-inch diameter. The second port is a detector port having a 1¼-inch diameter. The third port is an attachment port for inserting/removing a sample and a reference material into/ from the center of the integrating sphere. The centers of the beam and attachment ports are located about 90 degrees apart on the same great circle. The centers of the beam and detector ports are located about 120 degrees apart on the same great circle. The centers of the detector and attachment ports are located about 30 degrees apart on the same great circle. Place the integrating sphere so that the attachment port is vertically upward.

Use a KCl lens having f/4 and an index of refraction of 1.47. The lens is moisture-protected by coating it with a thin layer of IR transparent material, e.g. ZnSe. This lens is used in a compound hyperbolic concentrator (CHC) having a FOV ½ angle of 12.5 degrees ($\theta_c$) and concave side walls. Use a mercury cadmium telluride (MCT) detector mounted on the cold finger of a vacuum dewar. The MCT detector is placed at the output aperture of the CHC concentrator. The detector is maintained cool to about 80 degrees Kelvin using liquid nitrogen. Position the lens of the CHC concentrator on the surface of the integrating sphere at the detector port.

Mount a sample material (e.g. a navy-gray paint having a 1-inch diameter) and a reference material (e.g. gold-mirror having a 1-inch diameter) back-to-back on an attachment stem. The length of the attachment stem is about the radius of the integrating sphere (3.5 inches). Insert the mounted sample/reference material into the integrating sphere via the attachment port. The centers of the sample/reference material should be placed at about the center point of the sphere. Place the sample/reference material so that the plane defined by the front surface of the sample material is tiltable between 0 and 80 degrees from the tangential plane of the beam port.

Use a light source to emit a beam of light having wavelengths between 2,000–20,000 nanometers (e.g. a Nernst glower). Project this beam of light onto the front surface of the sample material. Record the output signal of the MCT detector generated by the light reflected by a field of view (FOV) on the inner surface of the integrating sphere. Rotate the attachment stem about 180 degrees so that the front surface of the reference material intersects the light beam at the same angle as did the front surface of the sample. Record the output signal of the MCT detector generated by the light reflected FOV. Calculate the ratio of the amplitude of the recorded sample signal to the amplitude of the recorded reference signal. Normalize the result by multiplying the ratio and the known reflectance of the reference material.

What is claimed is:

1. A reflectometer for measuring reflectance and transmittance of a sample, said reflectometer comprising:
   a light source for generating a beam of light;
   an integrating sphere having an inner surface, wherein said sample is mounted in the center of said integrating sphere;
   means for projecting said beam of light onto said sample whereby said beam of light is reflected by said sample in at least one direction onto said inner surface, wherein the integrating sphere includes a non-imaging concentrator for directing light reflected from the sample and falling upon a field of view (FOV) projection area upon a detecting surface, said non-imaging concentrator comprising a compound hyperbolic concentrator-lens combination wherein said lens has an index of refraction (n) of less than 2 and a focal (f) number of greater than 3;
   means for tilting the surface of said sample relative to said projected beam of light;
   means for preventing direct scattering of said reflected light from said sample onto said projection area of said field of view and said refracting surface; and
   detection means for measuring the power of said concentrated light at said detecting surface.

2. The reflectometer according to claim 1, wherein the inner surface of said integrating sphere is coated with a reflective coating layer.

3. The reflectometer according to claim 1, wherein said means for tilting the surface of said sample tilts said surface between about normal and about 80 degrees from normal.

4. The reflectometer according to claim 1, wherein said means for preventing direct scattering of said reflected light comprises a baffle.

5. A method for measuring reflectance and transmittance of a sample, said method comprising the steps of:
   mounting said sample in the center of an integrating sphere having an inner surface;
   projecting a beam of light onto said sample whereby said beam of light is reflected by said sample in at least one direction onto said inner surface;
   tilting the surface of said sample relative to the projected beam of light;
   producing concentrated light from said reflected light, and defining a projection area of a field of view (FOV) on the inner surface of said integrating sphere, by refracting said reflected light through a compound hyperbolic concentrator-lens combination wherein said lens has an index of refraction (n) of less than 2 and a focal (f) number of greater than 3 and directing said concentrated light to a detecting surface;
   preventing direct scattering of said reflected light from said sample onto said projection area of said field of view and said compound hyperbolic concentrator-lens combination; and
   detecting and measuring the power of said concentrated light at said detecting surface.

6. The method according to claim 5, wherein the inner surface of said integrating sphere is coated with a reflective coating layer.

7. The method according to claim 5, wherein the tilting of the surface of said sample tilts said surface between about normal and about 80 degrees from normal.

8. The method according to claim 5, wherein the prevention of direct scattering of said reflected light is accomplished by using a baffle.

* * * * *